US006275169B1

(12) United States Patent
Krygler et al.

(10) Patent No.: US 6,275,169 B1
(45) Date of Patent: Aug. 14, 2001

(54) PARKING METER

(76) Inventors: Agenor Krygler; Alicja Krygler, both of Bremer Strasse 53, D-21073 Hamburg (DE)

( * ) Notice: Subject to any disclaimer, the term of this patent is extended or adjusted under 35 U.S.C. 154(b) by 0 days.

(21) Appl. No.: 09/439,029

(22) Filed: Nov. 12, 1999

Related U.S. Application Data

(63) Continuation-in-part of application No. 09/308,059, filed as application No. PCT/EP98/07814 on Dec. 10, 1997, now abandoned.

(30) Foreign Application Priority Data

Aug. 26, 1999 (DE) .......................................... 299 14 816 U

(51) Int. Cl.[7] ...................................................... B60Q 1/48

(52) U.S. Cl. ....................... 340/932.2; 194/217; 194/902; 368/90; 368/92

(58) Field of Search ............................ 340/932.2, 309.15; 194/217, 218, 902; 368/90, 92 R, 89; 235/384, 381, 380, 378

(56) References Cited

U.S. PATENT DOCUMENTS 4,173,272 * 11/1979 Von Knorring ...................... 194/9 T
4,717,815 * 1/1988 Tomer ................................ 235/378
4,786,787 * 11/1988 Nawada et al. ...................... 235/381
4,861,971 * 8/1989 Chan .................................. 235/384
5,065,156 * 11/1991 Bernier ............................. 340/932.2
5,617,942 * 4/1997 Ward, II et al. ..................... 194/217
5,732,812 * 3/1998 Grainger et al. ..................... 194/217

* cited by examiner

*Primary Examiner*—Nina Tong
(74) *Attorney, Agent, or Firm*—Friedrich Kueffner

(57) ABSTRACT

A parking meter includes an input device for payment and at least one indicating device for indicating a paid parking time. The indicating device has at least one visual indicator for a corresponding number of parking spaces, wherein an actuating unit with an indicator is assigned to each parking space. All indicators, the actuating devices and the input device are connected to a common control device. A sound reproduction device provides an acoustic announcement about the paid parking time. The input device is a chip card actuating device. The indicator assigned to each actuating unit is designed such that the indicator represents at least three different states, wherein a first state indicates "paid parking time running", a second state indicates "paid parking time expired", and a third state indicates "paid parking time expired for longer than a predetermined time".

12 Claims, 4 Drawing Sheets

PARKING METER

CROSS-REFERENCE TO RELATED APPLICATIONS

This application is a continuation-in-part application of U.S. patent application Ser. No. 09/308,059, filed May 13, 1999 which claims the Benefit of National Stage of PCT/EP98/07814 filed Dec. 10, 1997, now is abandoned.

BACKGROUND OF THE INVENTION

1. Field of the Invention

The invention relates to a parking meter with an input device for means of payment and an indicating device for indicating the course of a paid parking time, whereby the indicating device has at least one visual indicating means respectively for a corresponding number of parking spaces, whereby an actuating means with an indicating means is respectively assigned to each parking space, whereby furthermore all indicating means, the actuating means and the input device for means of payment are connected to a common control device, whereby furthermore a sound reproduction device with an acoustic announcement about the paid parking time is provided for and the input device for means of payment is configured as a chip card actuating device.

2. Description of the Related Art

Especially in town centers with dense traffic, the available parking space is often limited. According to the state of the art, so-called parking meters are used to counter long-term parking; they have a slot for coins into which different coins can be inserted, depending on the desired parking time and necessary parking fees. By actuating a turning knob existing on the parking meter, the parking meter releases the selected and paid parking time. A rotating plate, which is connected to a clock, rotates after expiration of the parking time back to a "0-mark" which indicates the expiration of the paid parking time. The disadvantage of these parking meters consists in the quite complicated mechanism which, in addition to this, is susceptible to wear. Even if such parking meters are configured as double parking meters for two parking spaces, finally a time synchronously running mechanism is respectively required per parking space.

In many towns and municipalities, parking ticket issuing machines are used besides parking meters. These parking ticket issuing machines activate, after insertion of a certain amount of money and selection of the desired parking time, a printing unit which outputs the parking time resulting from the paid fees as final parking time. With this system, the parking space user is instructed to place the issued parking ticket inside the motor vehicle so as to be visible in such a way to allow to check if the parking time is exceeded. This method is quite troublesome for the parking space user since he has to cover the way there and back from the vehicle to the parking ticket issuing machine before he can lock the vehicle and leave the parking space. In addition, when being placed into the vehicle, the parking tickets are blown away from the instrument panel, where they always have to be placed, by external blast or already by slamming the door and lay on the floor of the vehicle, unrecognizable if they are to be checked. The parking ticket issuing machines also are complicated since they must comprise an electrically drive printing unit.

Moreover, it is known by the german model of utility 296 06 229 to provide a parking ticket issuing machine for each parking space with a supplementary housing with a window for the insertion of a parking ticket.

The aim of this invention is to make available a parking meter and a device for its control of the above mentioned type, whereby the preceding mentioned disadvantages are eliminated and the construction of the parking meter is improved and simplified and whereby the parking meter is easier to operate, also for checking persons.

To avoid receipts about the paid parking time which have to be placed in the vehicle so as to be visible, the WO 98/07 123 knows a parking meter according to the type with an input device for means of payment and with an indicating device for indicating the running of a paid parking time. The indicating device has at least one acoustic or visual indicating means for a corresponding number of parking spaces, whereby an actuating means is operationally connected to the indicating means assigned to it, whereby furthermore all indicating means, the actuating means and the insertion device for means of payment are connected to a common control device. A sound reproduction device with an acoustic announcement relating to the paid parking time is provided for. The indicating means are configured as visual devices, for example in the form of luminescent diodes, or as acoustic devices, whereby an indicating means is assigned to each actuating means. The insertion device for means of payment is configured as a coin actuating device and/or as a chip card actuating device.

SUMMARY OF THE INVENTION

The aim of this invention is to make available an improved parking meter of the above mentioned type which eliminates the above mentioned disadvantages and which is still easier to operate for the parking space user and which can be read by a checking person.

According to the invention, the indicating means which is assigned to each actuating means is designed in such a way that this indicating means represents at least three different states which can be read by a checking person, whereby a first state indicates to the checking person "paid parking time running", a second state indicates to the checking person "paid parking time expired" and a third state indicates to the checking person "paid parking time expired for longer than a predetermined time".

This has the advantage that a checking person can check centrally in a place, in a simple and quick way, for several parking spaces if the respective parking space users have paid the parking time claimed by them or if corresponding measures have to be taken to remove an unauthorized parking space user.

For a simple operability of the parking meter by a driver of a parking space assigned to a parking meter, the control device is designed so that, at each insertion of a chip card into the chip card actuating device, it debits the chip card with a predetermined unit and correspondingly adds up the units and acoustically outputs a parking time corresponding to the added units by means of the sound reproduction device. Hereby the predetermined unit corresponds, for example, to a parking time of 30 minutes.

To define a maximal parking duration, the control device is designed so that, after a predetermined number of chip card insertions, no further debit with a predetermined unit ensues or that the chip card actuating device is locked for further insertions of the chip card.

In a preferred embodiment, the indicating means contains at least one luminescent diode which represents the three states by means of at least one, however preferably two, however also three with different luminous colours and/or by means of differently intermittent or constant lighting up.

For example one luminescent diode is provided for, whereby an intermittent lighting up with a first predetermined frequency or with a first predetermined interval pattern signals the first state, an intermittent lighting up with a second predetermined frequency or a second predetermined interval pattern signals the second state and eventually an intermittent lighting up with a third predetermined frequency or a third predetermined interval pattern signals the third state, whereby especially one of the predetermined frequencies is infinite and corresponds to a continuous lighting up.

Preferably, two luminescent diodes with a different colour are provided for, whereby a lighting up of the luminescent diode with a first colour, for example green, signals the first state, a lighting up of the other luminescent diode with a second colour, for example red, signals the second state and the third state by alternating flashing of both luminescent diodes with a predetermined frequency or a predetermined interval pattern.

In a further embodiment, three luminescent diodes with different colours are provided for, whereby a luminescent diode with the colour green signals the first state, a luminescent diode with the colour red signals the second state and a luminescent diode with the colour yellow signals the third state by permanent light, i.e. by continuous lighting up and/or intermittent lighting.

The extinguishing of the lighting or flashing luminescent diodes can also be used as a signal for the running of the parking time.

For example, the "predetermined time" of the third state amounts to one hour so that, from one hour after expiration of the paid parking time on, the removal of the vehicle, which now occupies a parking space without being authorized to, can begin.

For a simple and clear operability by a driver and a simple and clear readability by a checking person without having to provide the parking spaces themselves, for example on the ground, with additional markings, the parking meter has a ground plan of the parking spaces assigned to this parking meter, whereby the actuating means and the indicating devices are arranged or indicated in the ground plan so that an actuating means and an indicating device are assigned to each parking space of the ground plan in an unmistakable way. Hereby, the assignation of the parking spaces indicated in the ground plan to real parking spaces results from the representation which is different with respect to the scale but coinciding with respect to the geometry between the ground plan and the real parking space arrangement. Therefore, additional markings to assign are not necessary.

A simple assignment of actuating elements and indicating devices on the parking meter to corresponding parking spaces on the ground plan is obtained by the fact that a symbol, especially a numeral, is assigned to each parking space in the ground plan on the parking meter, whereby the same symbol, especially the s a me numeral, is assigned to each actuating means and to each indicating device, as well as to the corresponding parking space.

Moreover it is provided for that the indicating device which is assigned to each case-shaped actuating means and which is made of a transparent or another light transmitting material comprises at least one luminescent diode and is designed such that it represents at least three different states which can be read by a checking person, whereby a first state indicates to the checking person "paid parking time running", a second state indicates to the checking person "paid parking time expired" and a third state indicates to the checking person "paid parking time expired for longer than a predetermined time", whereby the indicating device is placed in the interior space of the case-shaped actuating means.

Through the integration of the indicating device such as diodes into the different actuating means, the parking meter itself shows minimal dimensions, since no surface is required any longer on the parking meter casing front plate for the arrangement of the indicating means diodes.

Moreover, the configuration of the parking meter casing in two parts brings the advantage that the half shell shaped rear part of the casing can be directly integrated into the head of a column.

The parking meter does not issue any parking tickets; it registers the parking time of each vehicle on the parking meter. The driver does not need to go back to his vehicle after having paid the parking fees to deposit the parking ticket in his vehicle. The parking meter additionally informs acoustically the user about the paid parking time. Moreover, the parking meter indicates by a flashlight that the parking time is paid or expired; it is provided for the use of magnet cards/chips. If the magnet card is used or almost empty, the user is acoustically informed by the parking meter about it.

SHORT DESCRIPTION OF THE DRAWINGS

The invention will be explained in detail below with reference to the attached drawings.

DESCRIPTION OF THE PREFERRED EMBODIMENTS

Figure 1:
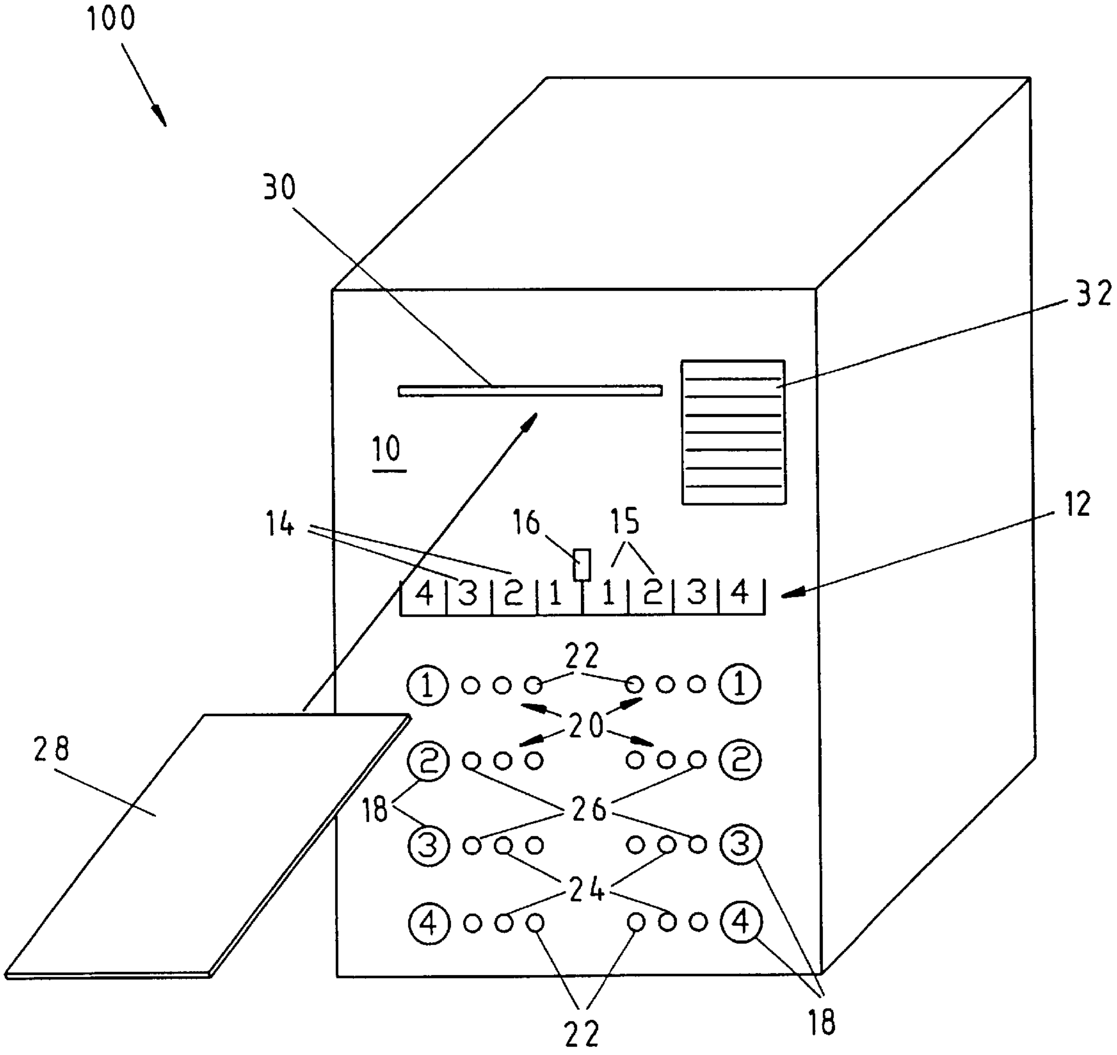
FIG. 1 is a graphical view of a preferred embodiment of a parking meter.

The preferred embodiment of a parking meter according to the invention 100 represented in FIG. 1 comprises a front plate 10 on which a ground plan 12 of parking spaces assigned to this parking meter 100 is placed. Each parking space 14 of the ground plan 12 is provided with a numeral, whereby a symbol 16 illustrates the location of the parking meter 100 in the ground plan. The parking spaces 14 or 15 which are on the right and on the left of the parking meter according to the invention 100 are numbered consecutively with the numerals "1" to "4". A respective actuating means 18 and a respective indicating device 20 is clearly assigned to each parking space 14, 15 for respectively the parking spaces 15 on the right of the parking meter 100 and the parking spaces 14 on the left of the parking meter 100 by means of the corresponding numerals "1" to "4". The number of parking spaces 14, 15 on the left and on the right of the parking meter according to the invention 100 can be selected at will and is here, for example, only respectively four.

Each of the indicating devices 20 comprises, according to a first embodiment, two luminescent diodes 24, 26, whereby the respectively first luminescent diode 26 lights up with a green colour as a confirmation for the fact that the parking time is paid, when the second luminescent diode 24 lights up with a red colour, it indicates that the paid parking time is expired. After expiration of this first red time phase, for a predetermined further time phase, red flashing light is emitted as an indication for the checking person that the parking time is expired for a long time so that, with this last time phase, the checking person is requested to arrange for the car to be towed away because of exceeding the parking time.

In a further embodiment, each of the indicating devices 20 contains three luminescent diodes 22, 24 and 26, whereby a respective first luminescent diode 22 lights up with yellow colour, a respective second luminescent diode 24 with red colour and a respective third luminescent diode 26 with green colour. Like also in the case of the first embodiment with two luminescent diodes, an inserting slot 30 is provided for the insertion operation of a chip card. Acoustic announcements for a parking space user ensue over a loudspeaker 32*a* in the way described hereunder.

Figure 2:
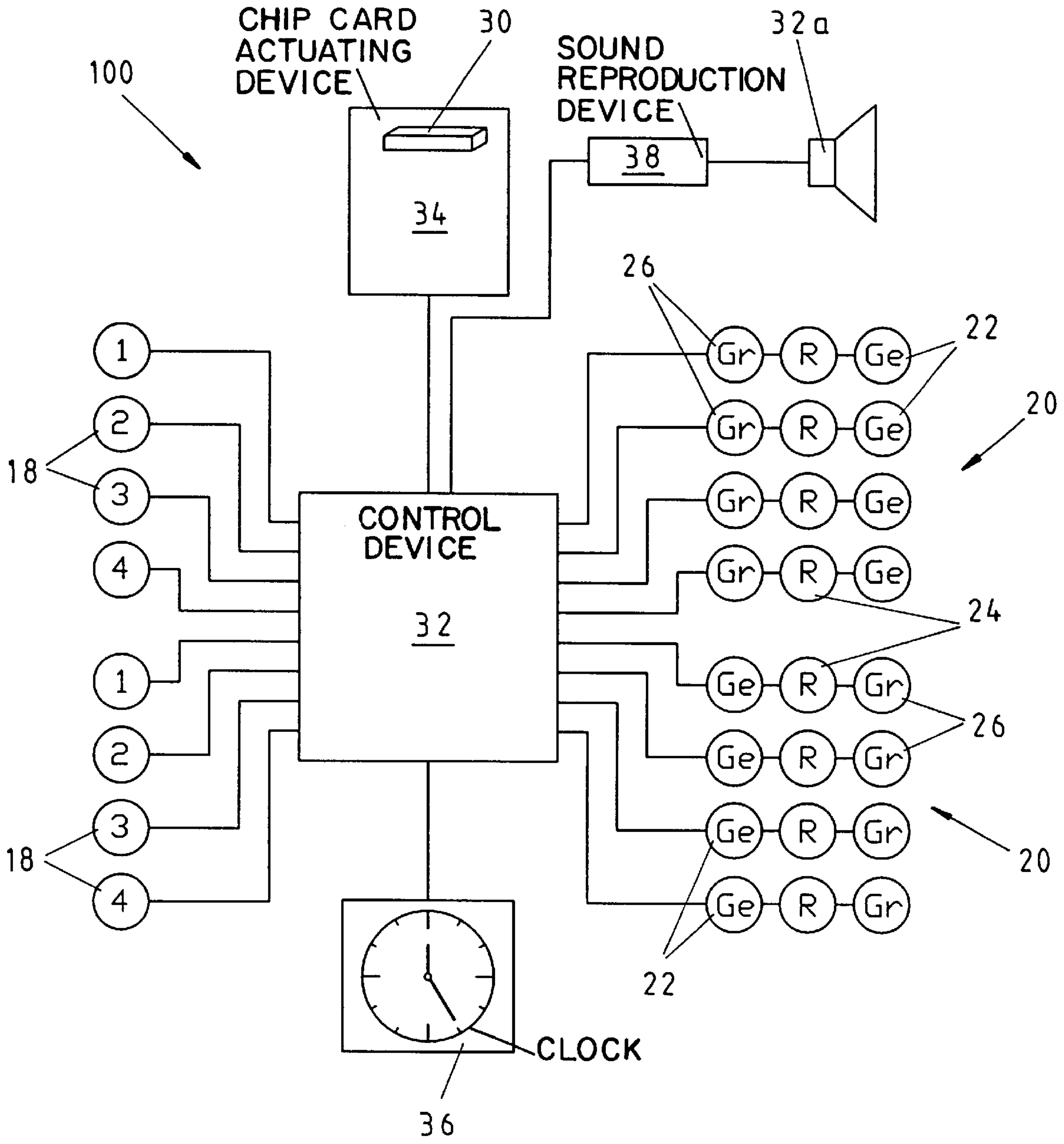
FIG. 2 is a schematic bloc diagram of a parking meter assembly according to FIG. 1.

FIG. 2 shows a schematic bloc diagram of the parking meter of FIG. 1 for an embodiment with three luminescent diodes, whereby the same parts are indicated by the same reference numerals so that reference is made to the description above of FIG. 1 for their explanation. The bloc diagram for an embodiment with two luminescent diodes is configured in the same way. Only the function of the first luminescent diode 22 with yellow colour light is integrated into the luminescent diode 24 with the red colour light, namely so that, in a first controlled time phase, the diode 24 emits red permanent light and, in a second controlled time phase, red flashing light. The yellow luminescent diodes 22 are additionally characterized with "Ge", the red luminescent diodes 24 are additionally characterized with "R" and the green luminescent diodes 26 are additionally characterized with "Gr", The luminescent diodes 22, 24, 26 of the indicating means 20 and the actuating means 18 are connected to a control device 32 which registers actuations of the actuating means 18 and which triggers time controlled the luminescent diodes 22, 24, 26 of the indicating devices 20 in the way described in detail below.

Moreover, a chip card actuating device 34 with an insertion slot 30, a sound reproduction device 38 with a loudspeaker 32*a* and a clock module 36 are connected to the control device 32. The clock module 18 serves as a timer for the control device 32 which triggers time controlled the luminescent diodes 22, 24, 26 of the indicating devices 20 and, eventually, the sound reproduction device. The control device 32 is, for example, a microprocessor unit and is preferably connected to the other components 18, 20, 34, 36 over a data bus.

The parking meter 100 is operated, for example, by means of cheque cards or other chip cards, similarly to telephone cards, whereby the chip cards, for example, can be bought as parking cards in service stations or in kiosks. A chip or parking card contains, for example, 500 units, whereby an unit corresponds to a predetermined parking time of, for example, 30 minutes.

An example of an actuation course of the parking meter 100 and of a reading by a checking person for an embodiment with three luminescent diodes 22, 24, 26 will be described below.

The parking card 28 with, for example, 500 parking units is inserted into the insertion slot 30. By this first insertion, the parking card 38 is debited with an unit for a parking time of ½ hour by the control device 32 and the card is withdrawn or output again. If a longer parking time is desired, the card will be inserted again, a further unit is debited by the control device 32 and the card is withdrawn or output again, whereby the parking time is summed up to 1 hour, 1½ hour, 2 hours etc., depending on the number of insertions of the parking or chip card. Appropriately, a maximal parking time of, for example, two hours, is predetermined so that the control device 32 does not debit any more unit after four insertions or locks the insertion slot 30 of the chip card actuating device 34.

Whenever the parking card is withdrawn or ejected out from the insertion slot 30, the control device 32 triggers the sound reproduction device 38 so that this sound reproduction device acoustically announces an actual added parking time over the loudspeaker 32*a*, thus after the first insertion for example "thirty minutes paid", "after the second insertion for example "sixty minutes paid", after the third insertion for example "ninety minutes paid" etc. Optionally, the parking meter according to the invention 100 indicates visually or acoustically, when inserting and/or withdrawing the chip card or when the chip card is output, how many units are still on this card or are memorized.

The number of actuating means 18 corresponds to the number of parking spaces 14, 15 assigned to the parking meter 100. As soon as the chip card is debited with a desired parking time in form of units and the parking space user is acoustically informed on the debited parking time for example with a "thank you" by the parking meter according to the invention 100, the parking space user confirms the actuating means 18 which corresponds to the respective parking space on which the parking space user has parked his vehicle. For the parking space "3" of the real parkings places 15 arranged on the right of the parking meter 100, for example, the actuating means "3" of the right row of the actuating means 18 is to be pushed (conf. FIG. 1). The procedure for an embodiment with two luminescent diodes 24, 26 is the same as described above.

Thereupon, the control device 32 triggers the indicating device 20 with the luminescent diodes 22, 24 and 26 or with the luminescent diodes 24, 26 assigned to this parking space so that the green luminescent diode 26 always lights up until expiration of the paid parking time. After expiration of the paid parking time, thus for example after one hour, the green luminescent diode 26 is extinguished, and the control device 32 controls the lighing up of the red luminescent diode 24. This signals to a checking person who supervises a correct paying of the parking space utilization that the paid parking time for this parking space is expired. After a further predetermined time of, for example one more hour, the control device 32 lets flash the red luminescent diode 24 for an embodiment with two luminescent diodes 24, 26 and lets the yellow luminescent diode 22 continuously light on or flash for the embodiment with three luminescent diodes 22, 24, 26. This signals to the checking person that the paid parking time is exceeded by more than the predetermined time, thus here by more than one hour, as far as the vehicle of the parking space user still is on this parking space. In this case, the checking person can order a removal of the vehicle which is now parking unauthorized, for example by driveaway-towaway.

To sum up, a lighting up of the green luminescent diode 26 thus signals that the paid parking time is still running, a lighting up of the red luminescent diode 24 that the parking time is expired and that a period of grace of, for example, one hour is running and a lighting up of the yellow luminescent diode 22 or a flashing of the red luminescent diode 24 that the parking time is exceeded by more than the period of grace of, for example, one hour and that the vehicle which is parked on the corresponding parking space 14, 15 is to be towed away. Herewith three different states are indicated time controlled.

In the alternative embodiment, only two luminescent diodes of different colour, for example only the red luminescent diode 24 and the green luminescent diode 26, are provided for. During the parking time, the green luminescent diode 26 lights up continuously, during the period of grace the red luminescent diode flashes and, after expiration of the period of grace, the red luminescent diode 24 lights up continuously or an inversed flashing sequence of permanent light and flashing light is also possible. This is alternatively performed with only one luminescent diode which can light up green as well as red dependently on the tension respectively applied.

For an embodiment with only a single luminescent diode, all permanent light and flashlight stages are combined in a luminescent diode. During the running time of the parking duration, this luminescent diode then emits green flashlight. If the parking time is expired, red flashlight is emitted by the same luminescent diode. If the flashlight period is expired, a short period, for example of 15 minutes, can follow with red permanent light. The control of the individual light and time periods is also performed by the control device 32.

The light emitted by the light diodes can be emitted in the form of flashlight, which is more economical, or of permanent light or alternatively of flashlight and permanent light. It is essential that the running parking time, the expired parking time and an additional time are visually indicated so that the different states can be recognized by the parking space user as well as by the checking person.

Each actuating means 18 configured as a push button has the shape of a casing , i.e is designed as a knob and is made of a transparent material or of another light transmitting material.

Figure 3:
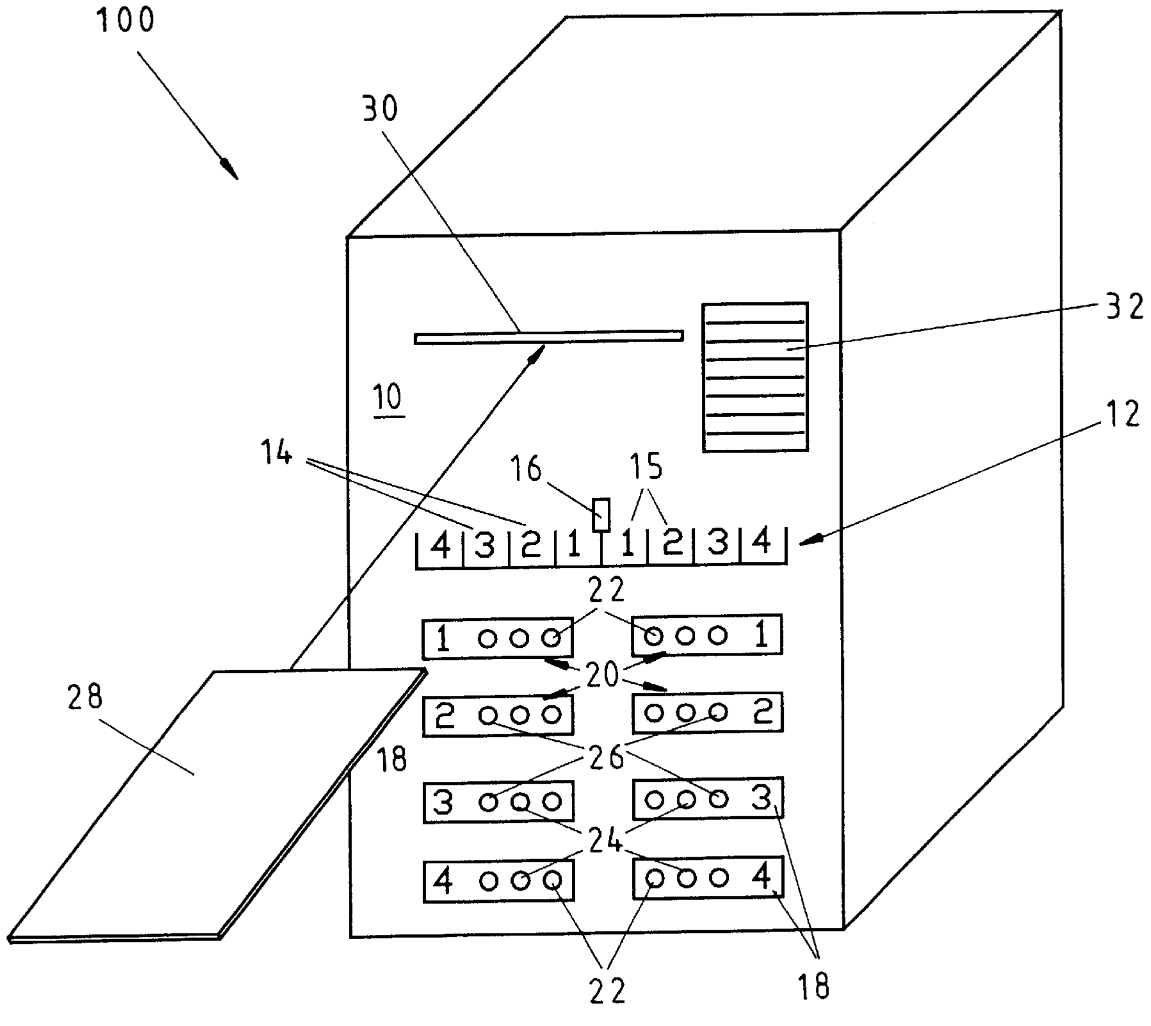
FIG. 3 is a graphical view of a further embodiment of a parking meter with an indicating device integrated into the actuating means.

Furthermore, each actuating means 18 receives in its interior space the indicating device 20 which is assigned to it, i.e. the respective necessary number of luminescent diodes 22, 24, 26 which constitute the indicating device, whereby the actuating means 18 can have the form of a cylindric casing or have a square or rectangular cross-section or any other geometrical form (FIG. 3).

Figure 4:
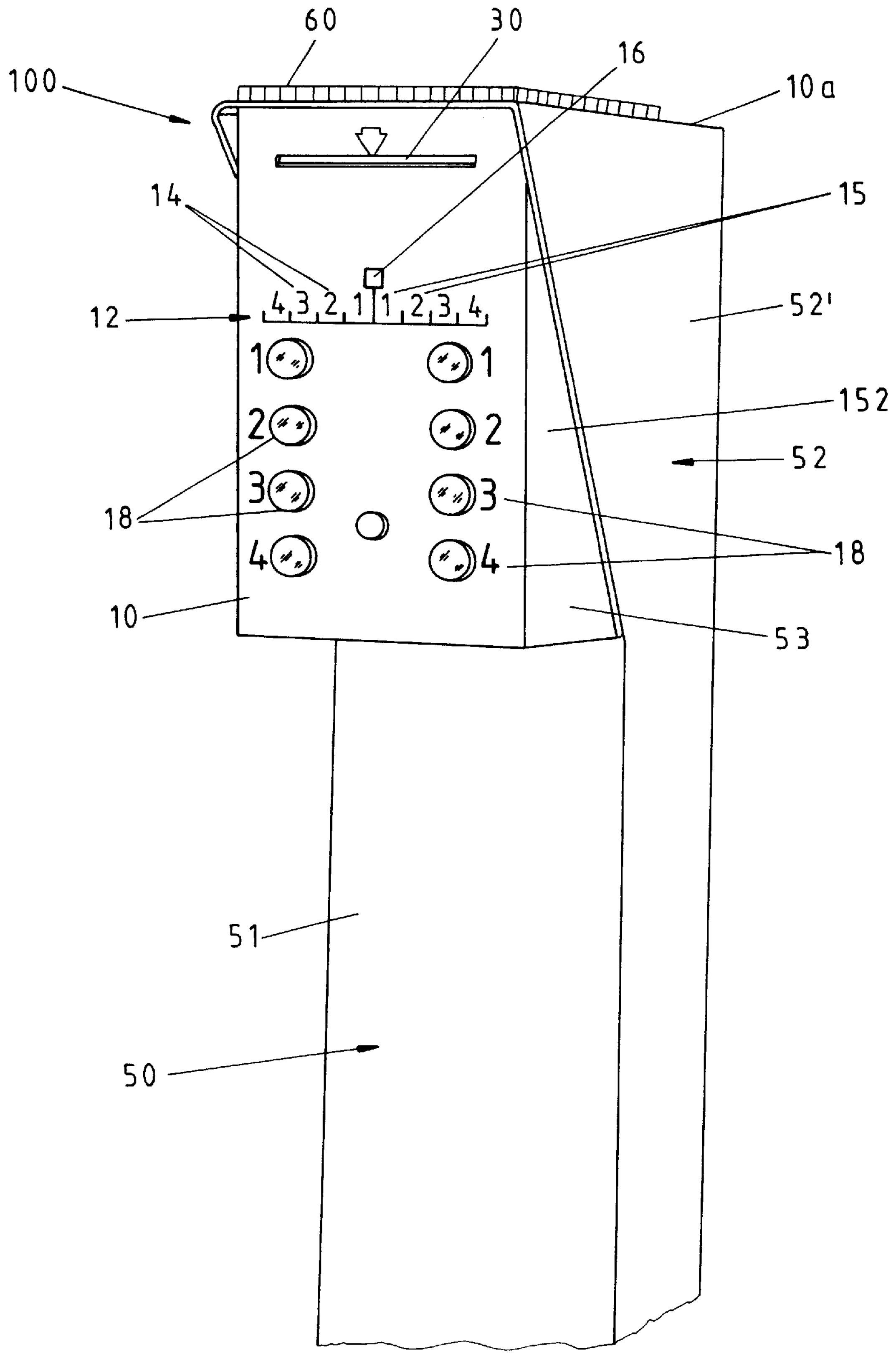
FIG. 4 is a graphical view of the parking meter integrated into a column.

According to the embodiment shown in FIG. 4, the parking meter 100 is configured as a two-part casing 52, 152, the half shell shaped casing parts 152, 52 of which are removably connected with each other. The casing part 152 is constituted by the front plate 10 and receives the input device 34, the actuating means 18 with the integrated indicating means 20 and the control device 32. Both casing parts 152, 52 complement each other to a case-shaped overall casing.

The rear casing part 52 can also be an integrated part of a column 50. To this end, the casing part 52 is integrated in the head 52' of the column 50, i.e. the head 52' of the column 50 is configured as casing part 52 so that the front plate 10 of the parking meter 100 is situated in the front area 51 of the column 50. The front casing part 152 of the parking meter can also be designed such that it projects from the front surface plane of the column 50.

The electric power supply of the control device 32 and of the indicating device 20 is carried out for example over batteries, over the mains supply or over solar cells 60 which can be placed on the upper covering plate 10*a* of the casing of the parking meter 100 (FIG. 4).

What is claimed is:

1. A parking meter comprising:

an input device for means of payment;

each parking space is assigned with an actuating means and an indicating device on said parking meter;

wherein each indicating device for indicating its respective parking space's paid parking time, wherein said each indicating device has at least three visual indicating means;

wherein the indicating means, the actuating means and the input device are connected to a common control device, and a sound reproduction device for providing an acoustic announcement about the paid parking time, wherein the indicating means assigned to each actuating means is configured such that the indicating means indicates at least three different states of operation, wherein a first state indicates "paid parking time running", a second state indicates "paid parking time expired" and a third state indicates "paid parking time expired for longer than a predetermined time", wherein the indicating device comprises at least one luminescent diode for indicating the three states by at least two different luminous colors and by different either intermittent or constant illumination thereof, wherein the input device for means of payment is configured as a chip card actuating device for chip cards as parking cards with a number of stored parking units deductible for each desired duration, wherein the control device is configured such that an insertion of the chip card into the chip card actuating device deducts a predetermined unit from the chip card and adds up the units and acoustically outputs a parking time corresponding to the added-up units over the sound reproduction device, wherein the control device is further configured such that, after a predetermined number of insertions of the chip card, no further deduction of a predetermined unit take place or the chip card actuating device is locked for further insertions of the chip card.

2. A parking meter according to claim 1, wherein the parking unit corresponds to a parking time of 30 minutes.

3. A parking meter according to claim 1, wherein the luminescent diode is configured to indicate three luminous colors.

4. The parking meter according to claim 1, wherein the control device is configured such that, after actuation of an actuating means, the control device assigns a parking time in accordance with a number of insertions of the chip card to the parking space corresponding to this actuating means, and the control device triggers the indicating device assigned to the actuating means in a time controlled manner according to the assigned parking time.

5. The parking meter according to claim 1, wherein the luminescent diode is configured such that an intermittent illumination with a first predetermined frequency or with a first predetermined interval pattern signals the first state, an intermittent illumination with a second predetermined frequency or a second predetermined interval pattern signals the second state, and an intermittent illumination with a third predetermined frequency or a third predetermined interval pattern signals the third state.

6. The parking meter according to claim 5, wherein one of the predetermined frequencies is infinite and corresponds to a continuous illumination.

7. The parking meter according to claim 1, comprising two luminescent diodes with different colors, wherein the diodes are configured such that a continuous illumination of a first luminescent diode with a first color signals the first state, a continuous illumination of a second luminescent diode with a second color signals the second state or the third state, and an intermittent illumination of one of the two luminescent diodes with a predetermined frequency or with a predetermined interval pattern signals the third state or the second state.

8. The parking meter according to claim 1, comprising three luminescent diodes with different colors, wherein the diodes are configured such that a green luminescent diode signals the first state, a red luminescent diode signals the second state, and a yellow luminescent diode signals the third state.

9. A parking meter according to claim 1, wherein the predetermined time of the third state is one hour.

10. The parking meter according to claim 1, comprising a ground plan of the parking spaces served by the parking meter, wherein the actuating means and the indicating devices are indicated on the ground plan such that each actuating means and indicating device is assigned clearly to each parking space.

11. The parking meter according to claim 10, wherein a symbol is assigned to each parking space in the ground plan, wherein the same symbol is assigned to each actuating means and each indicating device and the corresponding parking space.

12. The parking meter according to claim 11, wherein the symbol is a number.

* * * * *